(12) United States Patent
Watanabe

(10) Patent No.: US 8,850,962 B2
(45) Date of Patent: Oct. 7, 2014

(54) DEVICE FOR PUFFING SNACK AND SYSTEM FOR PRODUCING PUFFED SNACK FOOD

(75) Inventor: Ikuko Watanabe, Oita (JP)

(73) Assignee: Yugen Kaisha Ikukozu, Oita-Shi (JP)

( * ) Notice: Subject to any disclaimer, the term of this patent is extended or adjusted under 35 U.S.C. 154(b) by 346 days.

(21) Appl. No.: 13/148,698

(22) PCT Filed: Jan. 28, 2010

(86) PCT No.: PCT/JP2010/051146
§ 371 (c)(1),
(2), (4) Date: Nov. 15, 2011

(87) PCT Pub. No.: WO2010/092874
PCT Pub. Date: Aug. 19, 2010

(65) Prior Publication Data
US 2012/0067224 A1    Mar. 22, 2012

(30) Foreign Application Priority Data

Feb. 10, 2009  (JP) ................................. 2009-028466

(51) Int. Cl.
*F28D 1/02* (2006.01)
*A23L 1/18* (2006.01)
*A23L 1/217* (2006.01)
*A23L 1/00* (2006.01)
*A23P 1/14* (2006.01)

(52) U.S. Cl.
CPC ................ *A23P 1/142* (2013.01); *A23L 1/217* (2013.01); *A23L 1/181* (2013.01); *A23L 1/0085* (2013.01)
USPC ................................ 99/323.4; 99/353; 165/90

(58) Field of Classification Search
USPC ...................... 99/323.4, 349, 353; 165/89, 90
See application file for complete search history.

(56) References Cited

U.S. PATENT DOCUMENTS

| | | | | |
|---|---|---|---|---|
| 2,170,405 A | * | 8/1939 | Greenwood | ..................... 165/90 |
| 3,675,337 A | * | 7/1972 | Daane | ............................. 34/454 |
| 3,846,302 A | * | 11/1974 | Crocker | ........................ 210/774 |
| 3,994,215 A | * | 11/1976 | Rabeler | ............................ 99/483 |
| 4,520,578 A | * | 6/1985 | Schiel et al. | ..................... 34/110 |
| 5,094,156 A | * | 3/1992 | Noreille et al. | .................. 99/516 |

* cited by examiner

*Primary Examiner* — Reginald L Alexander
(74) *Attorney, Agent, or Firm* — Edwards Wildman Palmer LLP; James E. Armstrong, IV; George N. Chaclas

(57) ABSTRACT

This invention is a device for puffing snacks and a system for producing puffed snack foods. This invention makes it possible to overcome wiring problems, reduce heating costs of equipment for heat-pressing the ingredients of puffed snack foods, and expand the scale of the device, thereby increasing production efficiency. Pellets of ingredients are transported along a conveyor belt (14) through a hot water tank (13) where they are blanched. Next, the pellets are taken out of the hot water and moved underneath heaters (15). After being dried by the heater, the pellets are fed between rollers (21, 22) in prescribed portions within a prescribed time. The pellets are heat-compressed by the rollers (21, 22) and puffed. The space in the rollers (21, 22) is filled with hot steam so that the surface is uniformly heated.

8 Claims, 4 Drawing Sheets

DEVICE FOR PUFFING SNACK AND SYSTEM FOR PRODUCING PUFFED SNACK FOOD

FIELD OF THE INVENTION

A device for puffing snacks and system for producing puffed snack foods. This particular device for puffing snacks and system for producing puffed snack foods puffs snack ingredients by heat-pressing them with a pair of rollers.

BACKGROUND

Puffed snacks made from ingredients such as potato, corn, rice flour and legumes have always been widely loved for their delicious taste and light, crisp texture. These snacks are usually made by adding a puffing agent to the ingredients and deep-frying them in cooking oil to puff them up.

However, puffed snacks made by this method contain a lot of oil. This makes them high in fat and calories, potentially causing health problems if too many are consumed. This method is also at odds with the recent increase in health-consciousness.

In order to resolve the health issues associated with such puffed snacks, non-frying methods have been proposed as an alternative to deep-frying in oil. As the name suggests, non-frying methods produce the same crisp, light texture without frying the snacks in oil.

One such method is to puff up pellets of ingredients by heat-pressing them. This method makes it possible to maintain the same unique crisp, light texture of puffed snacks, without the high fat and calorie content caused by frying in oil.

The device for puffing snacks detailed in Patent Document 1 proposes one device to be used in this non-frying method in which ingredients are puffed by heat-pressing. This device heat-presses ingredients between a pair of opposing rollers and then instantaneously returns them to ordinary temperature and pressure. This causes the water in the ingredients to vaporize instantaneously, puffing the snacks.

In the invention detailed in Patent Document 1, the pair of rollers are supplied with oil that has been heated to around 220° C. (428° F.) with a heater. This oil moves between the rollers, maintaining a high temperature.

PRIOR ART

Patent Document

Patent Document 1: Japan Laid-open Patent No. 2005-27575

DISCLOSURE OF INVENTION

Problems to be Solved by the Invention

While the device for puffing snacks mentioned above can produce puffed snacks with excellent nutritional value while still maintaining the light, crisp texture, there are areas that need to be improved on: specifically, the heating method for the rollers that apply heat and pressure to ingredients.

As mentioned above, the device for puffing snacks detailed in Patent Document 1 keeps the rollers hot by running oil between them that has been heated by a heater. This means that the pipe to from the heater to the rollers, and the area between the rollers, has to be filled with oil. Depending on the length and width of the pipe and the volume of space between the rollers, this can require a vast quantity of oil.

This means that a large amount of heat is required to heat all the oil in the pipes and between the rollers, resulting in high energy costs. Regular maintenance is also required to maintain the quality of the oil passing between the rollers.

Another method used to heat these rollers is electric heating, with heating wire laid along the surface of the rollers.

However, with this form of electric heating, in order to puff the ingredients uniformly, the heating wire must cover the entire surface of the rollers to maintain a uniform heat across the surface. Thus, the greater the diameter of the rollers, the more heating wire needed, and the more electricity required to power them. As a result, this method, too, comes with massive costs, for the heating wire and energy.

In addition, as the rollers turn, the heating wire can tangle, or friction between leads can cause fraying, causing the machinery to break down.

The extremely high heating costs and maintenance of these previous heating methods (oil heating and electric heating) mean that such machinery can only be made on a small scale, limiting its scope for the mass-production of puffed snacks. The leads of the abovementioned heating wires also pose a problem.

This invention was conceived in order to solve these problems. The objective of this invention was to solve the problem with leads and reduce the cost of heating the equipment used to heat-press the puffed snack ingredients, as well as producing a device for puffing snacks that could be made on a large scale, increasing production efficiency.

Means for Solving the Problem

This invention is a device for puffing snacks conceived to solve these problems. It has heating and rolling equipment to heat-press ingredients (rollers, press), with a sealed space inside filled with hot steam.

This device for puffing snacks has two opposing, cylindrical rollers to heat-press the ingredients. These rollers have a sealed space inside filled with hot steam.

In one version of this device for puffing snacks, the rollers have a roughly cylindrical space inside. There is an inlet (supply passage) at one end of the cylinder and an outlet (outlet passage) at the other, with spiral ribs running along the cylinder shaft inside the roughly cylindrical space.

In another version of this device for puffing snacks, the rollers have a roughly cylindrical space inside. There is an inlet (supply passage) at one end of the cylinder and an outlet (outlet passage) at the other, with multiple ring-shaped ribs running along the inside of the roughly cylindrical space.

Another version of this invention is a system for producing puffed snack foods containing the abovementioned device for puffing snacks and a steam supply device to supply hot steam to the device. The steam supply device vaporizes water and supplies the hot steam to the rollers. The hot steam from the steam supply device is stored inside the rollers.

Another version of this system for producing puffed snack foods contains more than one of the abovementioned device for puffing snacks, with the steam supply device providing hot steam to the pair of rollers in each device for puffing snacks through a branched supply pipe.

Effect of the Invention

In this device for puffing snacks and system for producing puffed snack foods, hot steam is continuously passed through the inside of the rollers that heat-press the ingredients. This makes it possible to heat-press the ingredients at a low cost and ensures uniform heat across the surface of the rollers. In addition, as the rollers use steam as a heating medium, maintenance is easy, and additional devices can be added easily and at a low cost.

BEST MODE FOR CARRYING OUT THE INVENTION

Embodiment 1

(1) Structure of the System for Producing Puffed Snack Foods

Figure 1:
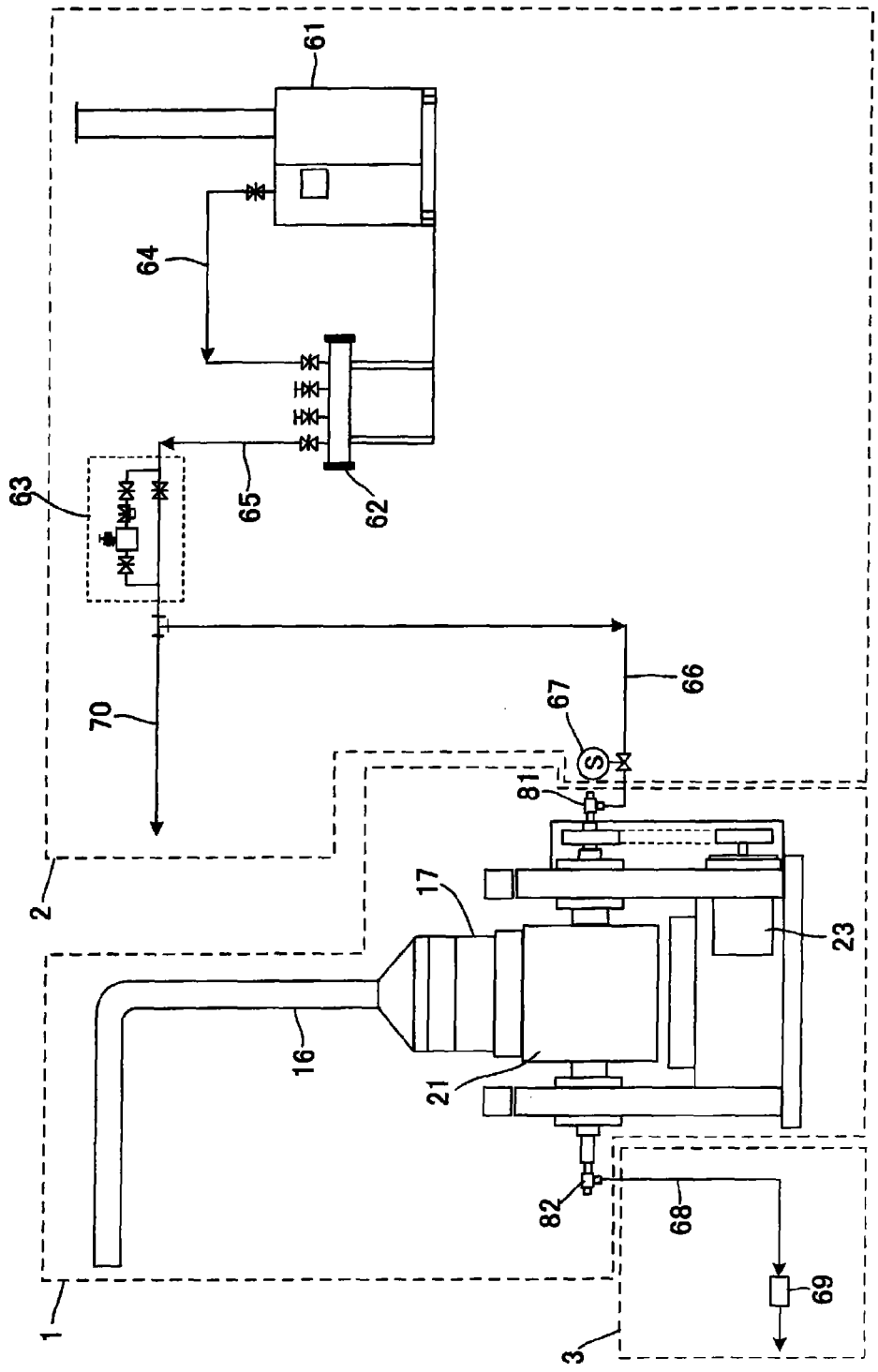
FIG. 1 This is a diagram of the system for producing puffed snack foods in Embodiment 1 of this invention.

FIG. 1 is a diagram of the system for producing puffed snack foods in Embodiment 1 of this invention.

As can be seen in the diagram, the system for producing puffed snack foods consists of a device for puffing snacks (1) that puffs the ingredients, a steam supply device (2) to supply hot steam to the device for puffing snacks (1) and an outlet (3) that drains the used hot steam from the device for puffing snacks (1).

A detailed description of the structure of the device for puffing snacks (1) and its specific processes will be given later, but here is a basic outline. The device for puffing snacks (1) puffs ingredients such as potato pellets by pressurizing them at high temperatures with a pair of rollers (21, 22) that rotate in opposing directions (Roller 22 cannot be seen in this diagram, as the viewpoint faces Roller 21, and Roller 22 is directly behind it.)

As will be detailed later, the rollers (21, 22) have a space inside them. The space inside the rollers (21, 22) is filled with hot steam to heat the surface of the rollers.

The steam supply device (2) produces hot steam and supplies it to the aforementioned space inside the rollers (21, 22) to heat the surface of the rollers (21, 22).

As can be seen in the diagram, the steam supply device (2) has the following structure:
The steam supply device (2) has a vaporizer (61), which produces hot steam. A steam header (62) collects the hot steam made by the vaporizer (61) and separates it into hot steam and condensation (drain water). It expels the drain water and distributes the hot steam into the applicable pipes. The hot steam expelled by the steam header (62) is then decompressed to a designated pressure by a decompression bypass (63). There are pipes (64-66) running between the vaporizer (61) and steam header (62), between the steam header (62) and decompression bypass (63), and between the decompression bypass (63) and rollers (21, 22). Supply Pipe 66 is opened and closed by an electromagnetic valve (67).

The outlet (3) expels drain water from the device for puffing snacks (1).

As shown in the diagram, the structure of the outlet (3) is as follows:

The outlet (3) is connected to the outlet joint (47; outlined below) of the device for puffing snacks (1). It has an outlet pipe (68) to expel the hot steam from the rollers (21, 22). The outlet pipe is connected to a steam trap (69), which separates the steam expelled through the outlet pipe (68) into steam and condensation and expels only the condensation. The abovementioned Supply Pipe 66 and the supply passage (44; outlined below) of the rollers (21, 22) are connected by a supply joint (81). The above-mentioned outlet pipe (68) and the outlet passage (46; outlined below) of the rollers (21, 22) are connected by an outlet joint (82).

As shown in the diagram, branch supply pipes (70) can run from the main supply pipe (66).

The steam supply device (2) with the abovementioned structure supplies hot steam to the device for puffing snacks (1) as follows:

The vaporizer (61) produces hot steam of a temperature around 300° C. (572° F.). An example of a method to produce hot steam is to produce saturated steam and then reheat it with a heater.

The hot steam produced by the vaporizer (61) passes through Supply Pipe 64 and is supplied to the steam header (62).

There, the hot steam is separated into steam and condensation and only the steam passes through Supply Pipe 65. The water is expelled from the steam header (62).

The hot steam from Supply Pipe 65 passes through the decompression bypass (63), where it is decompressed. It then passes through Supply Pipe 66, and when the electromagnetic valve (67) opens, it enters the rollers (21, 22).

Finally, the aforementioned outlet (3) expels the drain water as follows:

As the hot steam passes through the space in the rollers (21, 22), it cools and liquidizes, making drain water. This drain water builds up in the rollers (21, 22). The outlet pipe (68) expels both the hot steam that has passed through the rollers (21, 22) and the drain water that has built up in the rollers (21, 22).

The steam trap (69) separates the hot steam and drain water expelled from the outlet pipe (68) and expels only the drain water.

Joints such as rotary joints or rocky joints can be used for the supply joint (81) and outlet joint (82).

Structure of the Rollers (21, 22)

Next, here is a detailed explanation of the structure of the rollers (21, 22) to which hot steam is supplied.

Figure 2:
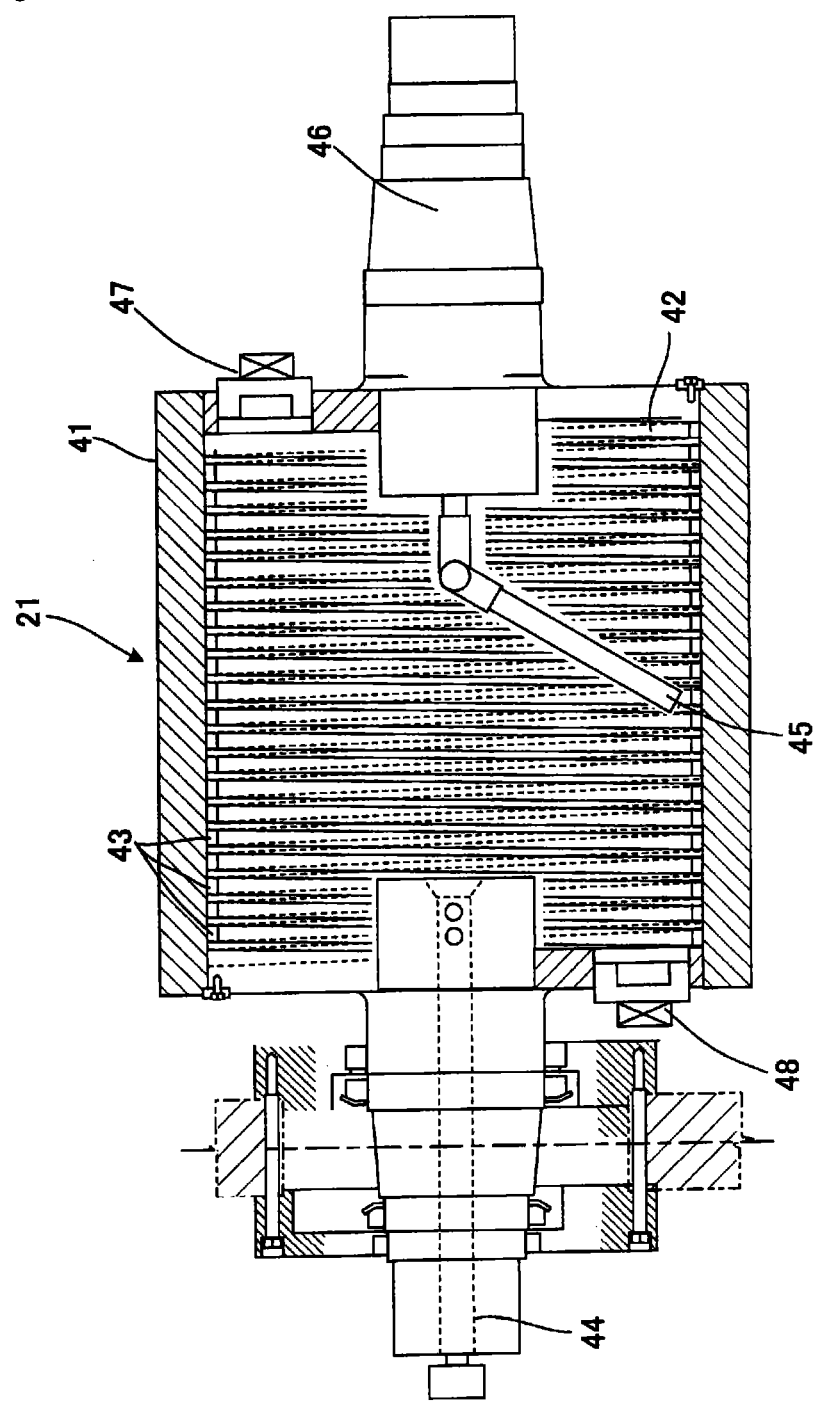
FIG. 2 This is a lengthwise cross-section of the rollers in Embodiment 1 of this invention.

FIG. 2 is a lengthwise cross-section of Roller 21.

Rollers 21 and 22 have the same structure. Thus, only Roller 21 will be explained in detail, with a brief explanation of Roller 22.

As can be seen in the diagram, the space inside Roller 21 is formed by the cylindrical roller body (41). 42 is the inner space inside the roller, which is formed by the roller body (41) and is filled with hot steam. Along the side of the inner wall of the roller body (41) is spiral ribbing (43). At one end of the roller body (41) is a supply passage (44), which supplies hot steam to the inner space (42).

A suction pipe (45) sucks the hot steam from the inner space (42), along with the drain water that has gathered on the bottom of the inner space (42). At the other end of the cylinder shaft of the roller body (41) is the outlet passage (46), which expels the hot steam and drain water sucked up by the suction pipe (45). Finally, there are peepholes (47, 48) to inspect the inner space (42).

The parts (41, 43, 44-48) of the abovementioned Roller 21 shall be made from metal that is rust-proof or has been given rust-proofing treatment. It is preferable that the roller body (41) and ribbing (43) in particular are made from metal with high heat conductivity.

The roller body (41) is a cylindrical drum-shaped rotating body, rotating widthways. It is preferable that the thickness between the surface of the roller body (41) and the inner wall that forms the inner space (42) be uniform, to allow uniform conduction of the heat of the hot steam from the inner wall to the surface.

The coils of the spiral ribbing (43) are spaced evenly apart. From a side view, it can be seen that the ribbing (43) is structured in a manner that will uniformly heat the roller body (41).

The ribbing (43) is also structured so that the axis of the spiral is roughly the same as the rotational axis of Rollers 21 and 22 and the roughly cylindrical inner space (42). As Rollers 21 and 22 turn, the hot steam is distributed uniformly across the inner wall of the roller body (41) from the perspective of the rotational axis.

One end of the suction pipe (45) is connected to the outlet passage (46) and the other end (the end) is open. A moveable body such as a bearing is set up in the middle of the pipe, providing a branch around which the end of the suction pipe (45) can move freely. As can be seen in the diagram, this structure means that the end of the suction pipe (45) moves around the bearing so that it constantly points downward despite the rotation of the rollers (21, 22).

This means that the end of the suction pipe (45) is constantly pointing in a direction that allows it to easily suck up the drain water on the bottom of the inner space (42). For example, in the diagram, the end of the suction pipe (45) is at a roughly 120° angle to the outlet passage (46).

The peepholes (47, 48) are used to inspect the inner space (42). While the system for producing puffed snack foods is operating, the peepholes (47, 48) are closed, so that the inner space (42) is completely sealed.

It is preferable to have multiple peepholes (47, 48) so that the whole of the inner space (42) can be inspected. As can be seen in the diagram, it is easier to inspect the whole of the inner space (42) if there are multiple peepholes (47, 48) enabling side and diagonal views.

The hot steam flows through the abovementioned roller structure (21, 22) as follows:

The hot steam passes through the supply pipe (66) and supply passage (44) into the inner space (42) of the rollers. As the rollers (21, 22) turn, the hot steam in the inner space (42) moves through the evenly-spaced spiral ribbing (43) on the inner wall of the roller body (41), from the supply passage (44) at one end to the outlet passage (46) at the other.

As the hot steam passes through the evenly-spaced spiral ribbing (43), the contact of the hot steam on the inner wall of the roller body (41) is uniform, meaning that the inner wall is heated uniformly. The heat energy applied to the inner wall is conducted radially from the inner wall to the surface (outer wall) of the roller body (41), heating the surface of the roller body (41) uniformly.

After making contact with the inner wall of the roller body (41), the hot steam cools and liquidizes and gathers on the bottom (lowest wall) of the inner space (42) as drain water. The constant supply of hot steam means that the air pressure in the inner space (42) is higher than that outside. The suction pipe (45) uses this difference in air pressure to suck up the hot steam and the drain water on the bottom of the inner space (42) and expel it through the outlet passage (46) and outlet pipe (68).

The rollers (21, 22) may fall under the category of type-2 pressure vessels specified in the JIS Standard for Pressure Vessel Structures. In this case, the thickness of the roller body (41) of the rollers (21, 22) is calculated as follows. The thickness of the body shell plate is calculated in Equation (1) and the thickness of the flat plates is calculated in Equation (2). "Shell plate" refers to the side of the cylinder and "flat plates" refers to the two ends.

Equation (1)

$$t = \frac{PDi}{2\sigma_a\eta - 1.2P} + \alpha \qquad \text{Equation (1)}$$

In Equation (1) above, P is the maximum allowable working pressure (MPa), Di is the inner diameter (mm) of the roller body (41), $\sigma_a$ is the allowable tensile stress (N/mm²) of the materials of the shell plate, η is the minimum efficiency (%) of the longitudinal joint and α is the corrosion allowance (mm).

Equation (2)

$$t = \sqrt{\frac{CfP}{\sigma_a}} + \alpha \qquad \text{Equation (2)}$$

In Equation (2) above, P is the maximum allowable working pressure (MPa), D is the diameter (mm), $\sigma_a$ is the allowable tensile stress (N/mm²) of the materials of the flat plate, $C_f$ is a constant determined by the method used to attach the flat plate, m is the calculated thickness of the shell divided by the thickness of the shell plate and α is the corrosion allowance (mm).

(3) Structure of the Device for Puffing Snacks (1)

Next, here is an explanation of the overall structure of the device for puffing snacks (1).

Figure 3:
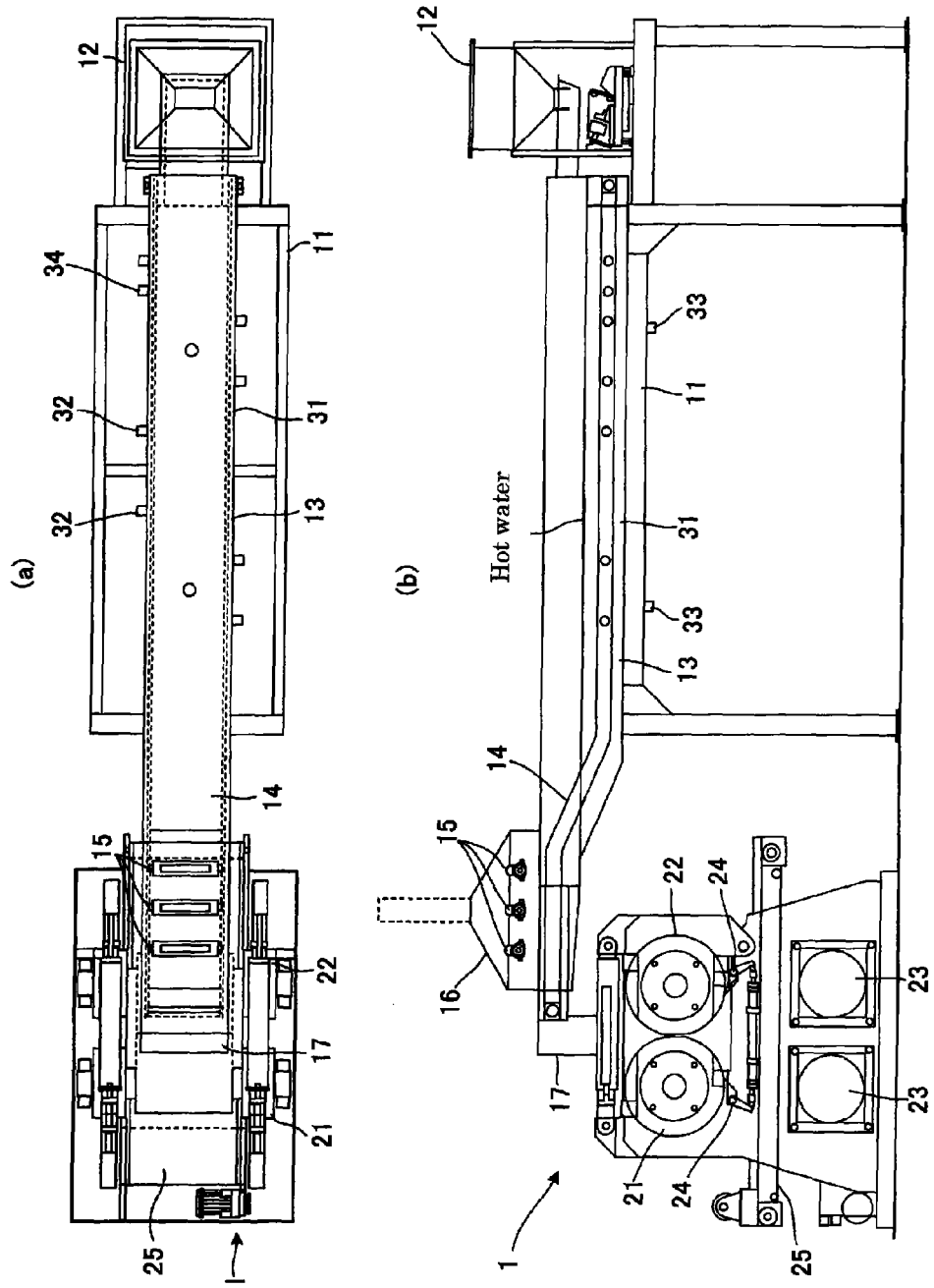
FIG. 3 This is a diagram showing the structure of the device for puffing snacks in Embodiment 1 of this invention. (a) is a top view and (b) is a side view.

FIG. 3 shows the structure of the device for puffing snacks (1). (a) is a top view and (b) is a side view. This diagram will be used to explain the structure of the device for puffing snacks (1).

In this embodiment of the invention, puffed snacks produced by the device for puffing snacks (1) will be made from vegetables such as potatoes, or from fruits or grains.

As can be seen in the diagram, the device for puffing snacks (1) in this embodiment of the invention consists of the following structure:

The parts of the device are supported by a mount (11). At one end of the mount is a hopper (12), into which puffed snack ingredients are fed. A hot water tank (13) filled with hot water runs the length of the mount (11). There is a conveyor belt (14) in the hot water tank (13); the puffed snack ingredients fed into the hopper (12) travel along this and are blanched in the hot water tank (13). At the other end of the mount (11) are heaters (15) to dry the ingredients that have traveled through the hot water tank (13) on the conveyor belt (14). The drying of the ingredients produces steam, which is expelled by an outlet (16). After being dried by the heaters (15), the ingredients are fed into another hopper (17) and are then heat-pressed by the opposing rollers (21, 22). The opposing rollers (21, 22) are powered by servo motors (23) and have doctor blades (24) to scrape off ingredients that have stuck to the rollers (21, 22). After being heat-pressed by the rollers (21, 22), the ingredients are carried to the next stage of production by another conveyor belt (25).

The hot water tank (13) consists of the following structure:

Hot water is stored in the tank body (31). The hot water is supplied to the tank by an inlet (32) and expelled from the tank by an outlet (33). A temperature sensor (34) is used to measure the temperature of the water in the tank body (31).

When the temperature sensor (34) measures the temperature of the water in the tank body (31), the reading is sent to a hot water supply device (not pictured in the diagram). If the reading is above or below a preset temperature, an electromagnetic valve (not pictured in the diagram) on the hot water supply device opens to adjust the temperature by supplying warm or cold water to the tank body (31) via the inlet (32) and expelling water through the outlet (33).

This maintains a constant water temperature in the hot water tank (13). The water is kept at a temperature (60-70° C. (140-158° F.) for potato ingredients, for example) that enables blanching to take place as the ingredients are soaked in the hot water. Blanching is a process in which ingredients such as vegetables are briefly placed in warm or hot water to deactivate the enzymes they contain, preventing discoloration and decline in quality.

The abovementioned conveyor belt (14) is set to allow sufficient time for the ingredients to be blanched. In the case of potato ingredients, for example, this is around 2-3 minutes. A moveable conveyor such as a net conveyor can be used for the conveyor belt (14).

The abovementioned heaters (15) are used to remove water droplets from the surface of the ingredients after they have been blanched in the hot water. Heaters such as far-infrared heaters can be used.

The rollers (21, 22) are a pair of cylindrical, drum-shaped rotating bodies, each rotating widthways and powered by a servo motor. As can be seen in the diagram, Roller 21 turns in a clockwise direction and Roller 22 turns in an anticlockwise direction. When ingredients are fed into the rollers (21, 22), they are pressed as they move downward between the rollers. The rollers (21, 22) are close together, just far enough apart that sliced ingredients can pass through.

As mentioned before, the rollers (21, 22) have a sealed inner space (42) inside. This inner space (42) is filled with hot steam, which keeps the surface of the rollers (21, 22) hot.

(4) Production Method of Puffed Snacks

Next, here is an explanation of how the device for puffing snacks (1) with the abovementioned structure will be used to produce puffed snacks.

Potato-based puffed snacks will be used as an example of how this embodiment of the invention is used.

First, potatoes are peeled and cut into pellets. These pellets are fed into Hopper 12 and then travel along Conveyor Belt 14 in prescribed amounts within a prescribed time.

As the pellets travel along Conveyor Belt 14, they are soaked (blanched) in the hot water tank (13) before reaching the heaters (15) at the end of Conveyor Belt 14. The conveyance time and water temperature depends on the ingredients, but for potato pellets the optimum temperature is around 60-70° C. (140-158° F.) and the optimum duration of blanching is around 2-3 minutes.

This blanching process gelatinizes the starch in the pellets, to prevent the pellets from turning brown over time.

After traveling through the hot water, the pellets are removed from the hot water tank (13) and moved under the heaters (15) where they are heat-dried. After this drying treatment, the moisture content of the pellets is around 5-20%.

The moisture that has evaporated from the pellets during the drying process is expelled by the outlet (16).

After being dried by the heaters (15), the pellets are fed into Hopper 17. They are then fed between the rollers (21, 22) in prescribed amounts within a prescribed time.

The pellets are heat-pressed and puffed by the rollers (21, 22).

The surface of the rollers (21, 22) is heated by hot steam. The temperature should be around 180-250° C. (356-482° F.). The pressure between the rollers should be between 700 and 3000 kg/cm$^2$, with the optimum being around 2000-3000 kg/cm$^2$.

The moisture that has evaporated from the pellets during this process is expelled via the same outlet (16).

After being puffed, the rotation of the rollers (21, 22) causes the pellets to drop onto Conveyor Belt 25. Any pellets that stick to the surface of the rollers (21, 22) are scraped off with a doctor blade, causing them to drop onto Conveyor Belt 25.

Conveyor Belt 25 then transports the pellets to the site of the next stage of production. The pellets are sorted, flavored, heated and finally packaged, completing the production process.

The optimum conditions are pellets with 13% moisture content being heat-pressed at a temperature of 200° C. (392° F.) and a pressure of 2500 kg/cm$^2$ and emerging with a moisture content of 4%. Producing puffed potato snacks under these conditions produces the crispest texture and most delicious taste.

(5) Summary of Embodiment 1 of this Invention

In this embodiment of the invention, as mentioned above, this device for puffing snacks heat-presses ingredients, using rollers (21, 22) with a hollow space inside. This space is filled with hot steam, heating the surface of the rollers (21, 22) uniformly at a prescribed temperature.

As the rollers (21, 22) are heated with steam, heating costs are low and maintenance is easy.

Each roller has a supply passage (44) at one end of the roughly cylindrical inner space (42) and an outlet passage at the other end. The hot steam travels between the two via spiral ribbing (43) on the inner wall of the roller body (41). The passage of the hot steam through this spiral ribbing (43) ensures a smooth flow of steam, and the heat energy of the steam touching the inner wall allows for continuous, uniform heating of the surface of the rollers (21, 22).

This embodiment of the invention produces puffed snacks by moving ingredients between rollers (21, 22) to heat-press them, but it is also possible to produce them by placing ingredients on a mount and heat-pressing them from above with a press.

In this case, the press would contain the same inner hollow filled with hot steam as the rollers (21, 22).

In addition, while the ribbing (43) outlined here takes the form of a spiral along the wall of the inner space (42), it is also possible to have ring-shaped ribbing at equal intervals along the cylinder shaft.

Embodiment 2

(1) Structure of the System for Producing Puffed Snack Foods

Figure 4:
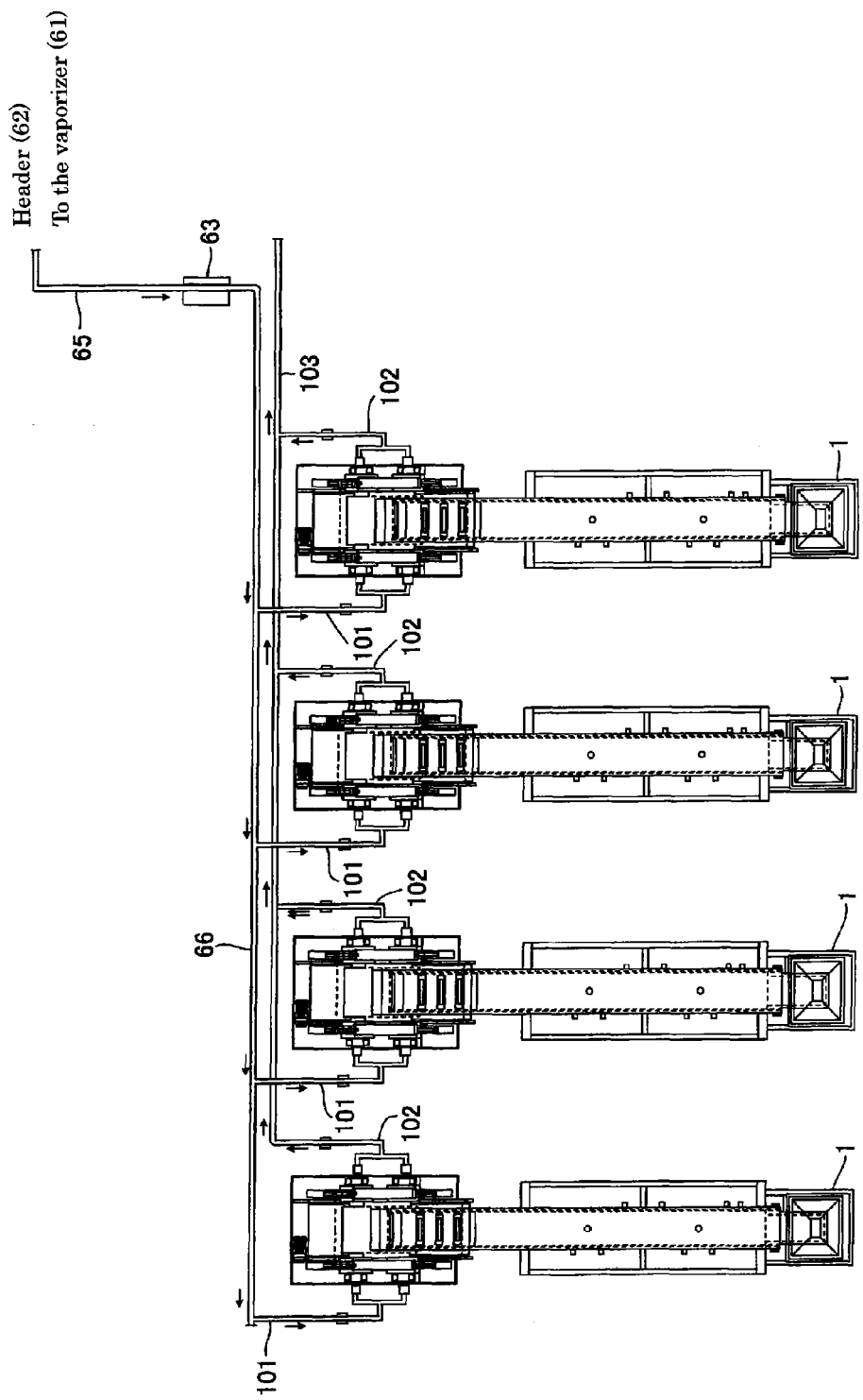
FIG. 4 This is a diagram showing the structure of the system for producing puffed snack foods in Embodiment 2 of this invention.

FIG. 4 is a diagram of the system for producing puffed snack foods in Embodiment 2 of this invention. This diagram will be used to explain the system for producing puffed snack foods in this embodiment of the invention. Any structures and operations not specified are the same as Embodiment 1.

As with Embodiment 1, this system for producing puffed snack foods contains a device for puffing snacks (1) and a steam supply device (2). Unlike Embodiment 1, however, this embodiment has multiple devices for puffing snacks (1).

As can be seen in the diagram, hot steam is produced by a vaporizer (61) and travels through a steam header (62) and decompression bypass (63), as with Embodiment 1. It then passes through a branched supply pipe (101) where it is supplied to the rollers (21, 22) of each device for puffing snacks (1).

As with Embodiment 1, the hot steam supplied to the rollers (21, 22) of each device for puffing snacks (1) travels through the inside of the rollers (21, 22) and heats them. It is then expelled via outlet pipes (102) connected to each device for puffing snacks (1). These outlet pipes are all connected to a main outlet pipe (103).

(2) Summary of Embodiment 2

In this embodiment of the system for producing puffed snack foods, as explained above, one steam supply device (2) supplies hot steam to multiple devices for puffing snacks (1) via a branched supply pipe (101).

In previous systems, adding more rollers (21, 22) is expensive: more oil needs to be purchased or more electric heating wire needs to be installed, and already high energy costs rise even further. In this system, the addition of new rollers (21, 22) generates much lower installation and energy costs.

Summary of Embodiments

As explained above, the rollers (21, 22) that heat-press the ingredients in each embodiment of the invention are heated by passing hot steam through an inner space (42) inside the rollers. This makes it possible to maintain a uniform heat across the surface of the rollers (21, 22) at a low cost. It also allows uniform puffing, meaning that all snacks produced have a delicious taste and crisp texture with little breakage.

In addition, as the rollers (21, 22) are heated by steam, the equipment requires little maintenance, and more devices can be added easily and cheaply.

In addition, the spiral structure of the ribbing (43) in the inner space (42) of the rollers (21, 22) in the abovementioned embodiments means that hot steam travels smoothly through the inner space (42), and the even spiral path means that the surface of the rollers (21, 22) is heated uniformly.

The above embodiments are preferred examples of this invention. This invention is not limited to these embodiments; various changes can be made without deviating from the point of the invention.

EXPLANATION OF REFERENCE NUMERALS

1: Device for puffing snacks
2: Steam supply device
3: Outlet
11: Mount
12, 17: Hoppers
13: Hot water tank
14, 25: Conveyor belts
15: Heater
16: Outlet
21, 22: Rollers
23: Servo motor
24: Doctor blade
41: Roller body
42: Inner space
43: Ribbing
44: Supply passage
45: Suction pipe
46: Outlet passage
47, 48: Peepholes
61: Vaporizer
62: Steam header
63: Decompression bypass
64-66, 70, 101: Supply pipes
67: Electromagnetic valve
68, 102, 103: Outlet pipes
69: Steam trap
81: Supply joint
82: Outlet joint

The invention claimed is:

1. A device for puffing snacks for producing puffed snack foods comprising two opposing, cylindrical rollers, which are heated by the device and between which ingredients are compressed and, in turn, become puffed, wherein: the two cylindrical rollers each define a sealed space fed by a supply passage and emptied by an outlet passage; the two cylindrical rollers each also define at least one peephole for visually inspecting the sealed space; a suction pipe for removing water that collects in the sealed space, the suction pipe being mounted on a moveable body to maintain a substantially constant position where the water collects; and, the two opposing, cylindrical rollers are heated by hot steam fed into the sealed space through the supply passage that creates relatively higher pressure in the sealed space that creates suction in the suction pipe.

2. The device for puffing snacks according to claim 1, wherein the rollers have a roughly cylindrical space inside spiral ribbing runs along an inner wall of the roughly cylindrical space.

3. The device for puffing snacks according to claim 1, wherein the rollers have a roughly cylindrical space inside and multiple ring-shaped ribs run along an inner wall of the roughly cylindrical space.

4. A system for producing puffed snack foods comprising the device for puffing snacks according to claim 1, the system further comprising a steam supply device to supply hot steam to the device for puffing snacks wherein the steam supply device produces hot steam and the steam produced by the steam supply device is fed into the rollers.

5. The system for producing puffed snack foods according to claim 4 comprising multiple devices for puffing snacks, wherein the steam supply device produces hot steam and supplies the hot steam it to the pair of rollers in each device for puffing snacks via a branched supply pipe.

6. A system for producing puffed snack foods comprising the device for puffing snacks according to claim 2, the system further comprising a steam supply device to supply hot steam to the device for puffing snacks wherein the steam supply device produces hot steam and the steam produced by the steam supply device is fed into the rollers.

7. A system for producing puffed snack foods comprising the device for puffing snacks according to claim 3, the system further comprising a steam supply device to supply hot steam to the device for puffing snacks wherein the steam supply device produces hot steam and the steam produced by the steam supply device is fed into the rollers.

8. A device for puffing snacks for producing puffed snack foods-comprising two opposing heat-pressing bodies between which ingredients are pressed and, in turn, become puffed, wherein: the two heat-pressing bodies each define a sealed space fed by a supply passage and emptied by an outlet passage; the two heat-pressing bodies each also define at least one peephole for visually inspecting the sealed space; a suction pipe for removing water that collects in the sealed space, the suction pipe being mounted on a moveable body to maintain a substantially constant position where the water collects; and the two heat-pressing bodies are heated by hot steam fed into the sealed space through the supply passage that creates relatively higher pressure in the sealed space that creates suction in the suction pipe.

\* \* \* \* \*